(12) United States Patent
Kutschak et al.

(10) Patent No.: US 9,887,619 B2
(45) Date of Patent: Feb. 6, 2018

(54) SYSTEM AND METHOD FOR A NORMALLY-ON SWITCHED MODE POWER SUPPLY

(71) Applicant: Infineon Technologies Austria AG, Villach (AT)

(72) Inventors: Matteo-Alessandro Kutschak, Ludmannsdorf (AT); Juan Miguel Martinez Sanchez, St. Magdalen (AT)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 53 days.

(21) Appl. No.: 14/739,773

(22) Filed: Jun. 15, 2015

(65) Prior Publication Data

US 2015/0372585 A1    Dec. 24, 2015

Related U.S. Application Data

(60) Provisional application No. 62/015,857, filed on Jun. 23, 2014.

(51) Int. Cl.

| H02H 7/125 | (2006.01) |
|---|---|
| H02H 7/122 | (2006.01) |
| H02M 7/08 | (2006.01) |
| H02M 1/36 | (2007.01) |
| H02M 1/42 | (2007.01) |
| H02M 3/335 | (2006.01) |
| H02M 1/00 | (2006.01) |

(52) U.S. Cl.
CPC ............ *H02M 1/36* (2013.01); *H02M 1/4225* (2013.01); *H02M 3/335* (2013.01); *H02M 3/33592* (2013.01); *H02M 2001/007* (2013.01); *Y02B 70/126* (2013.01); *Y02B 70/1475* (2013.01)

(58) Field of Classification Search
CPC ......................... H02M 2001/342; H02M 7/125
USPC ........................ 363/21.12–21.18, 50, 52–54, 363/56.06–56.08, 56.12, 67–69
See application file for complete search history.

(56) References Cited

U.S. PATENT DOCUMENTS

| 5,883,484 A * | 3/1999 | Akao ................... B60L 11/1807 318/139 |
|---|---|---|
| 6,646,842 B2 * | 11/2003 | Pan ......................... H02H 9/001 323/222 |
| 7,403,400 B2 * | 7/2008 | Stanley ..................... G05F 1/70 323/225 |
| 8,094,475 B2 * | 1/2012 | Friebe ....................... H02J 3/38 363/132 |

(Continued)

FOREIGN PATENT DOCUMENTS

| CN | 1728490 A | 2/2006 |
|---|---|---|
| CN | 103166464 A | 6/2013 |

(Continued)

*Primary Examiner* — Gary Nash
(74) *Attorney, Agent, or Firm* — Slater Matsil, LLP (57) ABSTRACT

A method for operating a switched mode power supply (SMPS) during a start-up sequence includes receiving an input current at a bias supply circuit while a first relay and a second relay coupled to a first side circuit within the SMPS are open, generating a first bias supply voltage based on the received input current, closing the first relay after generating the first bias supply voltage, conducting the input current through the first relay and through an in-rush resistor coupled in series with the first relay, and closing the second relay after a first time period.

19 Claims, 5 Drawing Sheets

(56) References Cited

U.S. PATENT DOCUMENTS

| | | | |
|---|---|---|---|
| 9,337,689 B2 | 5/2016 | Liu et al. | |
| 9,496,859 B2 | 11/2016 | Weis | |
| 9,667,161 B2 | 5/2017 | Cao et al. | |
| 2005/0017695 A1* | 1/2005 | Stanley | H02M 1/4208 323/207 |
| 2009/0152950 A1* | 6/2009 | Zhang | H02H 7/1213 307/43 |
| 2009/0180229 A1* | 7/2009 | Lee | H02H 7/1213 361/91.1 |
| 2011/0134671 A1* | 6/2011 | Balocco | H02M 1/32 363/126 |
| 2011/0157925 A1* | 6/2011 | Wang | H02M 3/33507 363/21.17 |
| 2011/0216563 A1* | 9/2011 | Ribarich | H02M 7/217 363/124 |
| 2011/0235378 A1* | 9/2011 | Tang | H02M 7/062 363/84 |
| 2011/0254512 A1* | 10/2011 | Nergaard | H02J 7/022 320/162 |
| 2012/0099351 A1* | 4/2012 | Kim | H02J 9/005 363/50 |

FOREIGN PATENT DOCUMENTS

| | | |
|---|---|---|
| CN | 103681666 A | 3/2014 |
| CN | 103683468 A | 3/2014 |

\* cited by examiner

SYSTEM AND METHOD FOR A NORMALLY-ON SWITCHED MODE POWER SUPPLY

This application claims the benefit of U.S. Provisional Application No. 62/015,857, filed on Jun. 23, 2014, which application is hereby incorporated herein by reference.

TECHNICAL FIELD

The present invention relates generally to a system and method for a power supply, and, in particular embodiments, to a system and method for a normally-on switched mode power supply (SMPS).

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

An SMPS usually includes at least one switch and an inductor or transformer. Some specific topologies include buck converters, boost converters, and flyback converters, among others. A control circuit is commonly used to open and close the switch to charge and discharge the inductor or transformer. In some applications, the current supplied to the load and/or the voltage supplied to the load is controlled via a feedback loop.

For some power supply systems, a transformer is used between a primary side circuit and a secondary side circuit. In one example of an AC-DC converter for large voltages, the transformer provides isolation between the large voltage AC signal and the converted DC signal. The primary side circuit may include a rectifier and a switched converter coupled to the transformer while the secondary side may include a filter or further rectification circuit. For an SMPS, it is known that an in-rush current may be received at the input during start-up. Such an in-rush current may damage the SMPS if not properly handled during start-up.

SUMMARY

A method for operating a switched mode power supply (SMPS) during a start-up sequence includes receiving an input current at a bias supply circuit while a first relay and a second relay coupled to a first side circuit within the SMPS are open, generating a first bias supply voltage based on the received input current, closing the first relay after generating the first bias supply voltage, conducting the input current through the first relay and through an in-rush resistor coupled in series with the first relay, and closing the second relay after a first time period.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely power supplies, and more particularly, a switched mode power supply (SMPS). Some of the various embodiments described herein include start-up or in-rush sequence control for power supplies and an SMPS with normally-on switches. In other embodiments, aspects may also be applied to other applications involving any type of circuit according to any fashion as known in the art.

According to various embodiments, an SMPS including normally-on transistors in an input stage is described herein. In order to protect the SMPS and accommodate the behavior of the normally-on transistors, first and second relays are coupled between the input and the input stage of the SMPS. A start-up sequence includes opening both relays while a bias supply circuit receives an in-rush current and provides a first bias supply voltage to the input stage. Once the input stage receives the initial bias supply voltage from the bias supply circuit, the first relay is closed to conduct the input current through an in-rush resistor to the input stage. After a certain time period, the first relay is opened and the second relay is closed to conduct the input current directly to the input stage.

According to various embodiments, normally-on transistors or devices are included in SMPS applications such as AC/DC, DC/DC or DC/AC converters. New materials for power transistors and devices, such as SiC (silicon carbide) and GaN (gallium nitride) for example, yield naturally normally-on devices. For example, these devices may include SiC junction field effect transistors (JFETs) or GaN high electron mobility transistors (HEMTs). Forming, configuring, or modifying these devices such that they operate as normally-off transistors or devices may result in disadvantages such as additional devices (e.g., in the cascode configuration), additional reliability risks (e.g., lower reliability in some SiC MOSFETs), or decreased electrical performance (e.g., poor performance of some normally-off HEMTs). Further, normally-on devices may lead to short circuit conditions at input and output terminals for various embodiment circuits, such as power supplies for example, and may be difficult to use in power conversion applications without the application of embodiments described herein.

However wide band gap devices offer significant potential for better figure-of-merits such that the use of wide band gap transistors and devices as normally-on devices is highly desirable in order to provide improved power conversion solutions. In some embodiments described herein, methods of operation and corresponding circuits are presented that incorporate normally-on devices in power supply circuits, such as an SMPS for example, while preventing short circuit conditions at the input and output.

Figure 1:
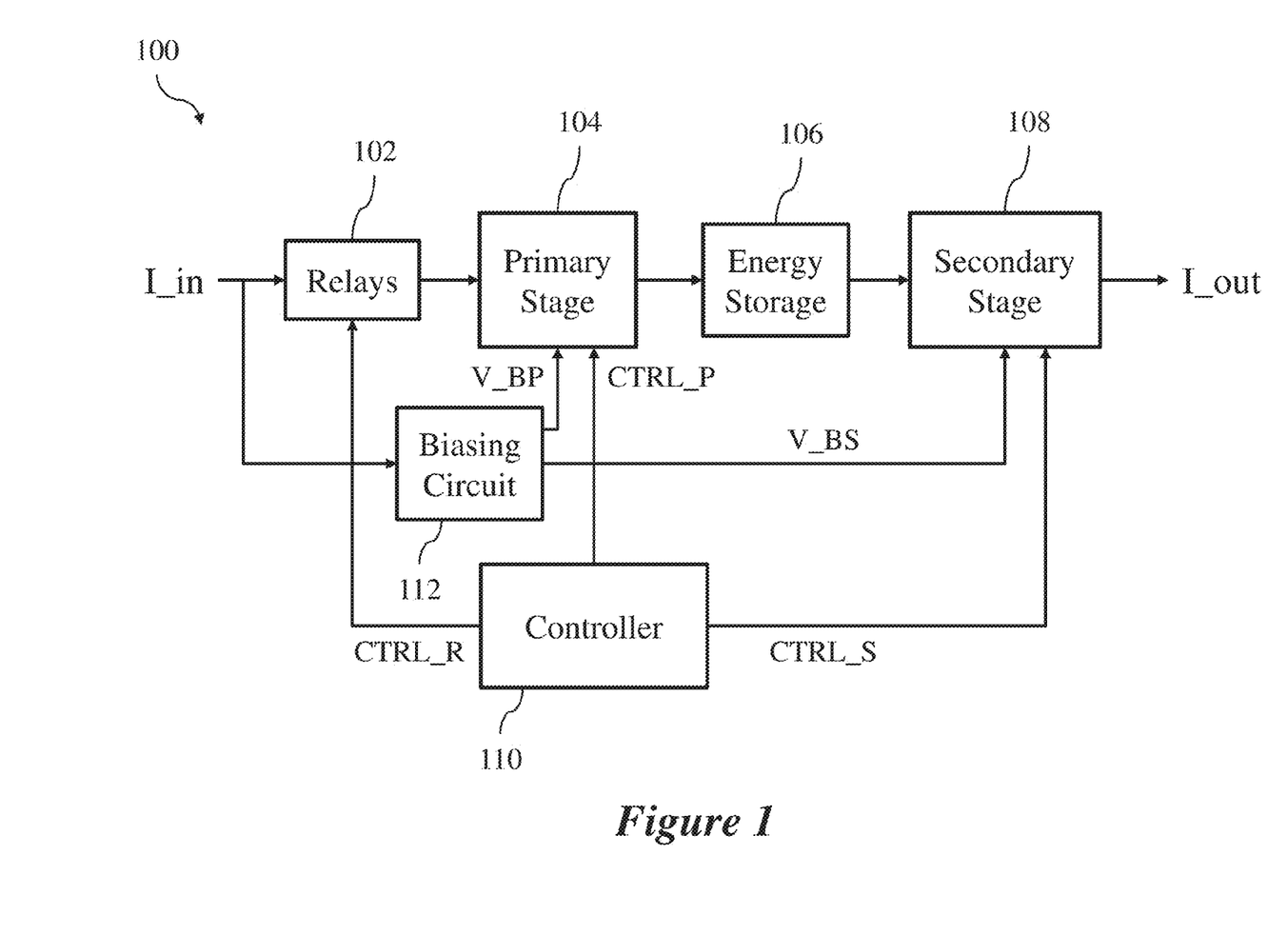
FIG. 1 illustrates a system block diagram of an embodiment switched mode power supply (SMPS)

FIG. 1 illustrates a system block diagram of an embodiment switched mode power supply (SMPS) 100 including relays 102, primary stage 104, energy storage 106, secondary stage 108, controller 110, and biasing circuit 112. According to various embodiments, SMPS 100 receives input current I_in and performs a voltage or current conversion to provide output current I_out. During normal operation, relays 102 may be controlled by control signal CTRL_R from controller 110 to conduct input current I_in to primary stage 104 with a minimal resistance. Primary stage 104 and energy storage 106 may provide controlled switching for voltage or current conversion through secondary stage 108 in order to provide output current I_out. Biasing circuit 112 may provide bias voltages for primary stage 104 and secondary stage 108. In various embodiments, primary stage 104 may include normally-on transistors or devices, and both primary stage 104 and secondary stage 108 may receive switching control signals from controller 110 in the form of control signal CTRL_R and control signal CTRL_S, respectively. Secondary stage 108 may also include normally-on transistors or devices in some embodiments.

According to various embodiments, controller 110 provides control signal CTRL_R to relays 102 during a start-up procedure to safely start power conversion in SMPS 100. In such embodiments, controller 110 may control relays 102 using control signal CTRL_R to execute three steps during the start-up procedure. In the first step, controller 110 controls relays 102 to operate in a high impedance or non-conducting state where all relays in relays 102 are opened or non-conducting. During the first step, the input current I_in, which may be considered an in-rush current, is received at biasing circuit 112 and an initial bias voltage is generated and supplied for primary stage 104. Following the first step, relays 102 are controlled to operate in a conducting resistive state during the second step where a first relay in relays 102 is closed and is conducting in series with an in-rush resistor (not shown). During this second step, the closed first relay and in-rush resistor in relays 102 conduct input current I_in to primary stage 104. During step three of the start-up procedure, a second relay is closed and the first relay may be opened again in order to conduct input current I_in through the second relay, and not through an in-rush resistor, to primary stage 104. In various embodiments, step three of the start-up procedure is a transition to normal operation of SMPS 100 where input current I_in is conducted through a low resistance path to primary stage 104 in order to minimize resistive power dissipation and improve efficiency. In other embodiments, while the second relay is closed, the first relay may also be closed during step three.

In various embodiments, primary stage 104 may include filters, active or passive rectifiers, and various typologies of SMPS circuits, such as buck, boost, or buck-boost converters, for example. In one particular embodiment, primary stage 104 includes a power factor correction (PFC) circuit coupled to a DC-DC converter, such as a buck converter, for example.

In some embodiments, energy storage 106 may include a transformer. Alternatively, energy storage 106 may include only an inductor. In some embodiments, energy storage 106 may include a combination of an inductor and a transformer or any number of inductors and transformers. Further, biasing circuit 112 may generate the initial bias voltage at least for primary stage 104 during the first step of the start-up procedure. Biasing circuit 112 may also provide bias voltages V_BP and V_BS for primary stage 104 and secondary stage 108, respectively, during normal operation of SMPS 100. As described herein, normal operation is used to refer to any operation of a switching converter circuit, such as SMPS 100, after completing a start-up procedure.

According to some embodiments, secondary stage 108 may include any type of output circuit. For example, secondary stage 108 may include output filters or smoothing circuits. Secondary stage 108 may include a rectification circuit. In some embodiments, secondary stage 108 may include protection components, such as switches, for decoupling an output load from SMPS 100 in some situations.

According to various embodiments, controller 110 may include a microcontroller. In other embodiments, controller 110 may include an integrated circuit (IC), such as a fully or partially custom application specific integrated circuit (ASIC). In some embodiments, controller 110 may include a discrete analog control circuit. In still further embodiments, controller 110 may include some combination of ASIC, microcontroller, or discrete analog circuit, or any number of each. Specifically, SMPS 100 may operate with a number of controllers of multiple types that are represented by controller 110. In specific embodiments, a power-on controller is configured to generate control signal CTRL_R and execute the start-up procedure while another controller is, or other controllers are, configured to provide switching signals for primary stage 104, secondary stage 108, and biasing circuit 112. In the various different embodiments, control signals CTRL_R, CTRL_P, and CTRL_S may each include multiple control signals for switching transistors, relays, or other components.

Figure 2:
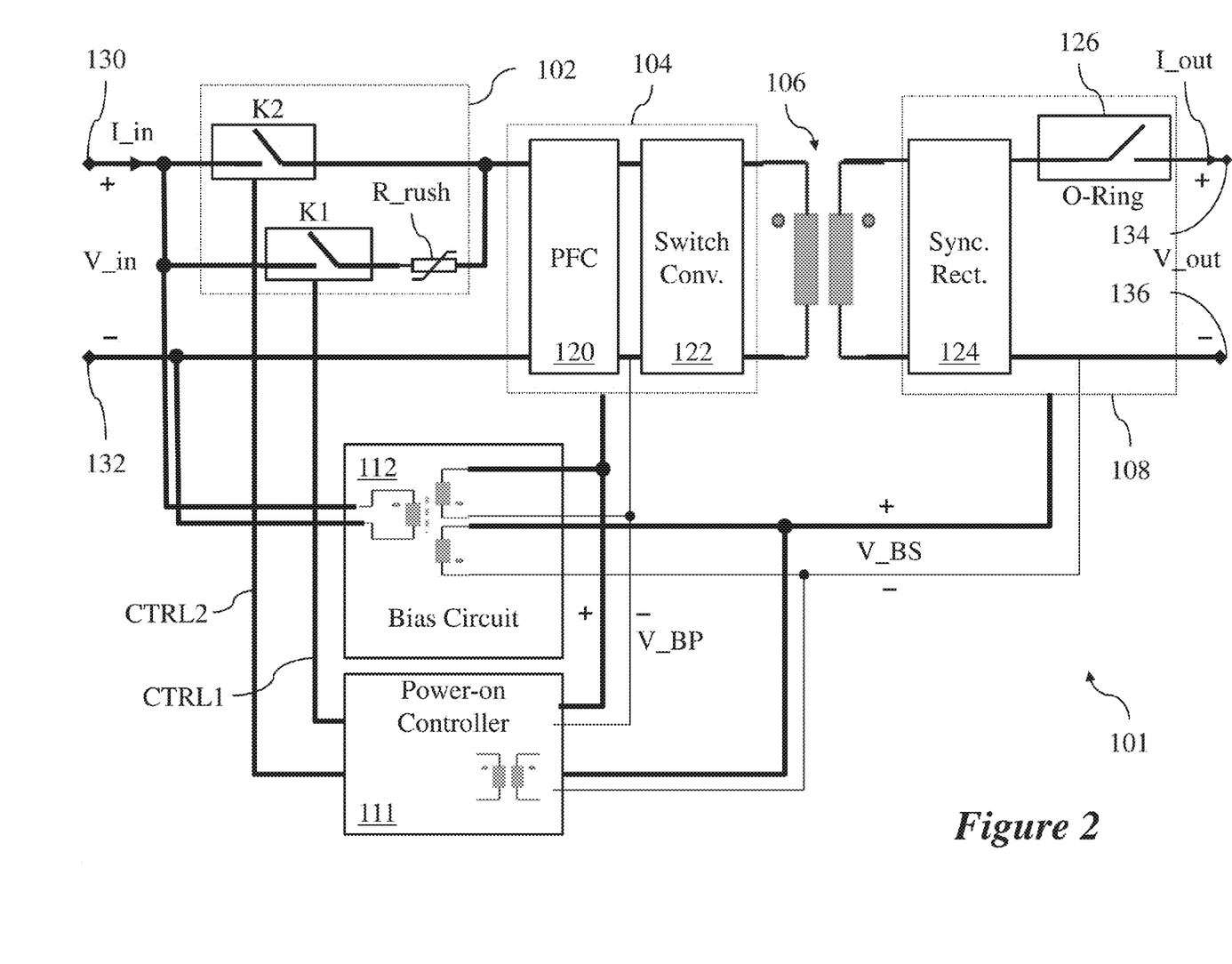
FIG. 2 illustrates a system block diagram of another embodiment SMPS.

FIG. 2 illustrates a system block diagram of another embodiment SMPS 101 that may be a specific embodiment of SMPS 100 as described in reference to FIG. 1. According to various embodiments, SMPS 101 includes specific examples of relays 102, primary stage 104, energy storage element 106, secondary stage 108, biasing circuit 112, and power-on controller 111, which may be a portion of controller 110 as described in reference to FIG. 1. In such embodiments, relays 102 include first relay K1 and second relay K2 coupled between positive input terminal 130 and primary stage 104. Relays K1 and K2 are controlled by control signals CTRL1 and CTRL2, respectively, to conduct or not conduct input current I_in from input terminal 130 to primary stage 104. Relay K1 is coupled with in-rush resistor R_rush to conduct input current I_in in series when closed while relay K2 is coupled directly to primary stage 104 to conduct with a very low resistance path when closed.

In various embodiments, biasing circuit 112 generates primary bias voltage V_BP and secondary bias voltage V_BS based on input voltage V_in received at input terminals 130 and 132. Primary bias voltage V_BP and secondary bias voltage V_BS may also be supplied to power-on controller 111. In some embodiments, biasing circuit 112 includes a transformer, inductor, or a combination of both elements. Biasing circuit 112 may also include a controllable switch for enabling and disabling the bias voltage generation at biasing circuit 112. Further, in various embodiments, power-on controller 111 may include any of the elements or combinations thereof described above in reference to controller 110 in FIG. 1.

According to the specific embodiment shown in FIG. 2, primary stage 104 performs power factor correction (PRC) at PFC circuit 120 and switching conversion at switching converter 122. In some embodiments, PFC circuit 120 may be considered an AC-DC conversion stage and switching converter 122 may be considered a DC-DC stage. PFC circuit 120 may include normally-on transistors, an inductor, a capacitor, and semiconductor diodes arranged as an active rectification circuit in one embodiment. The semiconductor components, such as the normally-on transistors, may include various materials, such as Si, SiC, and GaN in three specific embodiments. Other materials are also possible.

Following the PFC at PFC circuit 120, switching converter 122 may include any type of switching converter, such as a buck, boost, or buck-boost converter. Other types of switching converters are also possible. Energy storage 106 from FIG. 1 may be implemented as a transformer 106 as shown in FIG. 2. In various embodiments, transformer 106 is coupled to synchronous rectification circuit 124, which may provide output filtering or smoothing in addition to rectification after switching conversion. Synchronous rectification circuit 124 is coupled to output terminals 134 and 136, which supply converted output voltage V_out. A decoupling switch, such as O-Ring 126, may be coupled between synchronous rectification circuit 124 and output terminal 134 or 136 in order to decouple a load attached to output terminals 134 and 136 in some operating conditions. O-Ring 126 may include a normally-off transistor in some embodiments.

SMPS 101 may be a specific embodiment of SMPS 100. In various other embodiments, SMPS 100 may be implemented as any type of switching power converter according to various embodiments described herein, especially including embodiment start-up procedures as described herein.

Figure 3:
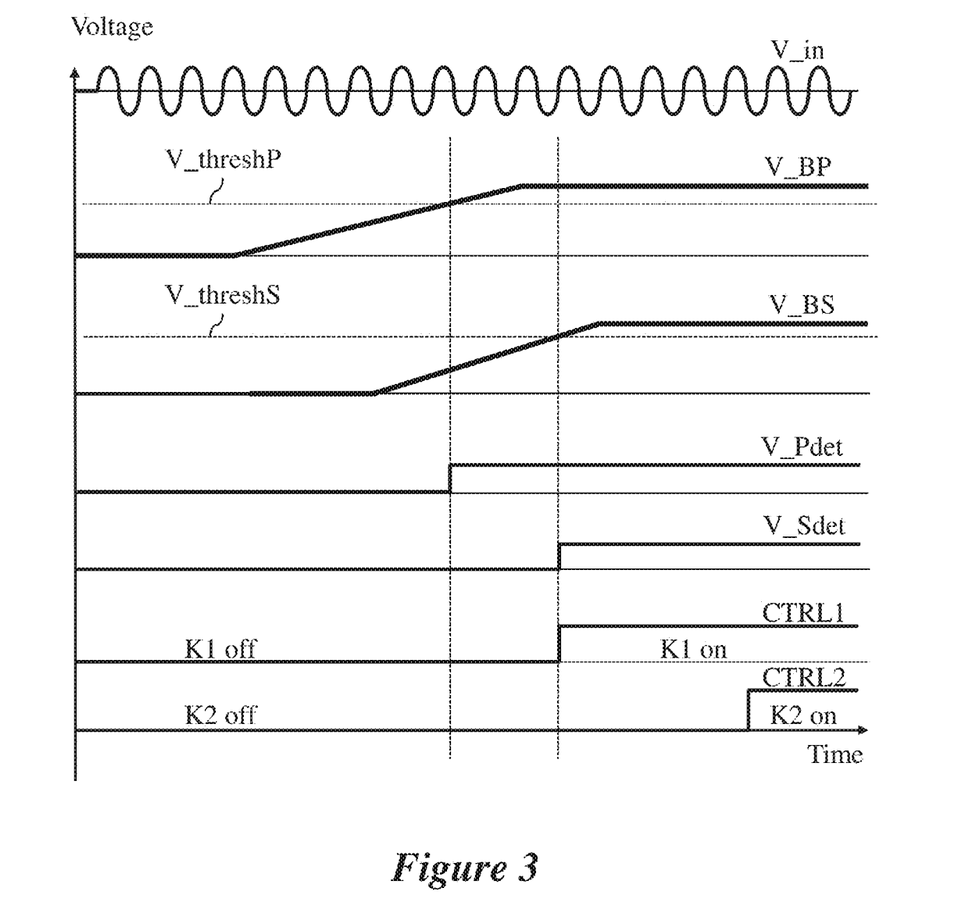
FIG. 3 illustrates a timing diagram of an embodiment SMPS.

FIG. 3 illustrates a timing diagram of an embodiment SMPS operated during a start-up procedure and including input voltage V_in, primary bias voltage V_BP, secondary bias voltage V_BS, primary bias detection signal V_Pdet, secondary bias detection signal V_Sdet, relay K1 control signal CTRL1, and relay K2 control signal CTRL2. According to various embodiments, input voltage V_in may be an AC signal received at input terminals. When input voltage V_in is first applied (with input current I_in, as described above in reference to FIGS. 1 and 2) the SMPS, such as SMPS 101 for example, may be in an off state with no activated or biased switches or elements. In such a state, relays K1 and K2 are off (i.e., open or non-conducting) according to control signals CTRL1 and CTRL2, as shown. Because relays K1 and K2 are open, input voltage V_in is not applied to the primary stage. However, input voltage V_in is applied to biasing circuitry for generating primary bias voltage V_BP, which begins to rise while relays K1 and K2 are kept closed.

In various embodiments, before relays K1 or K2 are closed, primary bias voltage V_BP and secondary bias voltage V_BS may pass voltage enabling thresholds V_threshP and V_threshS, respectively. As shown, once primary bias voltage V_BP passes threshold V_threshP, primary bias detection signal V_Pdet is activated to signal passing threshold V_threshP. Similarly, once secondary bias voltage V_BS passes threshold V_threshS, secondary bias detection signal V_Sdet is raised to signal passing threshold V_threshS. When both primary bias detection signal V_Pdet and secondary bias detection signal V_Sdet are activated, control signal CTRL1 is activated to close relay K1 for conduction through relay K1 and an in-rush resistor. The generation and measurement of the signals described in reference to FIG. 3 may occur in a controller and attached circuit, such as controller 110 or power-on controller 111 as described in reference to FIGS. 1 and 2.

In various embodiments, after a time period control signal CTRL2 is activated to close relay K2 for conduction through relay K2 to the primary stage. In such embodiments, the time period may be a fixed time period as set by a system designer or customer in some cases. In other embodiments, the time period is programmable on the fly. The time period may also be based on circuit properties or measurements indicating voltage levels on any of input, output, or switching capacitors, for example. When relay K2 is closed, the SMPS enters normal operation and exits the start-up procedure. During normal operation, relay K1 may be opened or closed in various embodiments.

According to various embodiments, the timing diagram illustrated in FIG. 3 depicts signals operated with an active high logic signal. In various other embodiments, detection and control signals may also be operated with an active low logic signal. Similarly, bias and supply voltages may also be referenced to negative voltages instead of positive voltages in some alternative embodiments.

Figure 4:
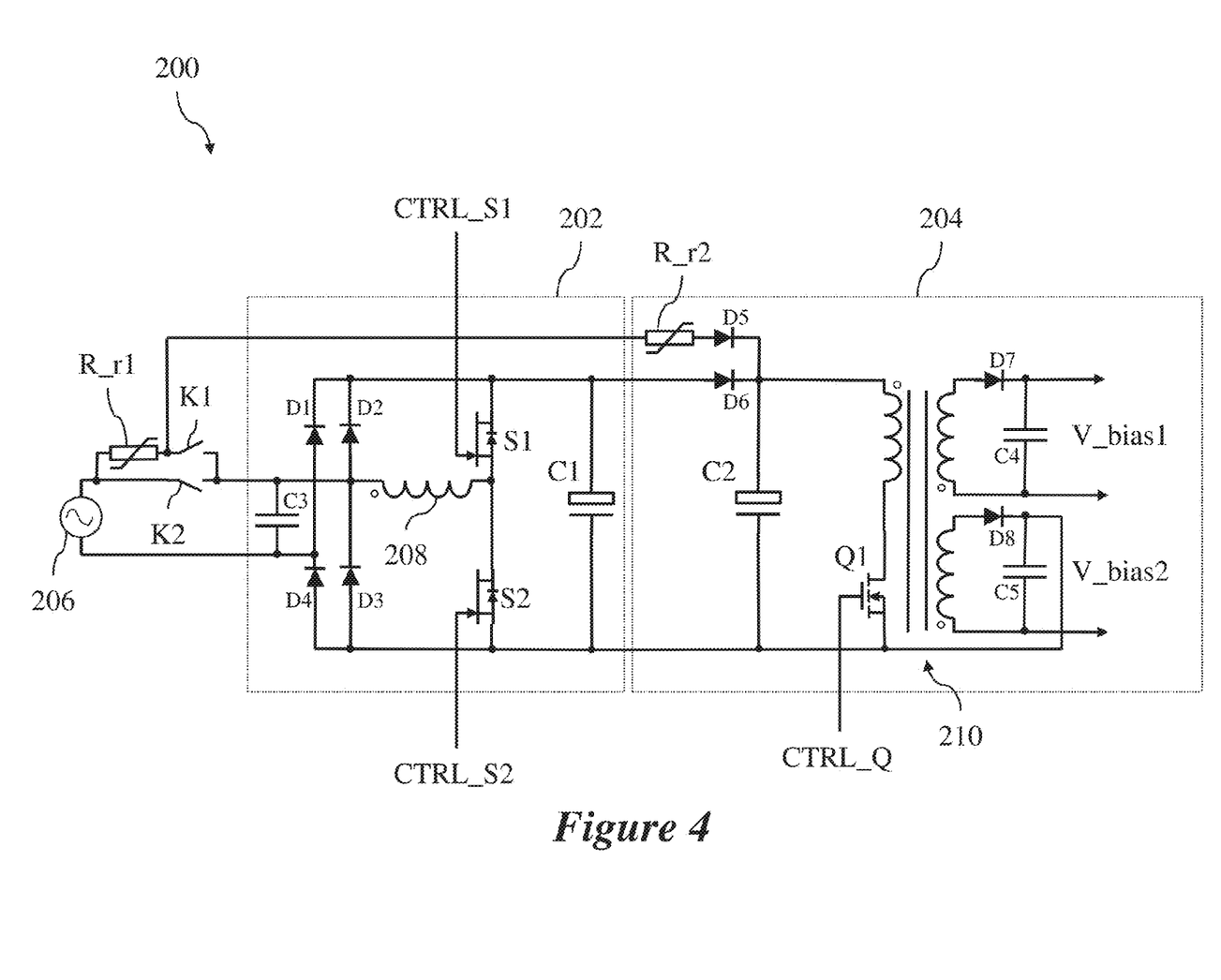
FIG. 4 illustrates a schematic of an embodiment SMPS.

FIG. 4 illustrates a schematic of an embodiment SMPS depicting a portion of an SMPS 200 including a primary stage 202 with normally-on transistors S1 and S2, relays K1 and K2, and a bias circuit 204. According to various embodiments, relays K1 and K2 are opened during a start-up procedure, causing an in-rush current from alternating current source 206 to flow through in-rush resistors R_r1 and R_r2 and diode D5 to charge capacitor C2 and supply transformer 210. In such embodiments, transistor Q1 in bias circuit 204 is controlled by control signal CTRL_Q from a controller (not shown, such as controller 110 as described in reference to FIG. 1) to generate bias voltages V_bias1 and V_bias2. In some embodiments, bias voltages V_bias1 and V_bias2 are primary bias voltage V_BP and secondary bias voltage V_BS, for example.

In various embodiments, after bias voltages V_bias1 and V_bias2 are generated within bias circuit 204, relay K1 may be closed to conduct the input current through in-rush resistor R_r1 to primary stage 202. In some embodiments, relay K1 may be closed after capacitor C2 is charged to a first voltage. As described further above, after a time period, relay K2 may also be closed as SMPS 200 enters normal operation. During normal operation, relay K1 may open or closed in different embodiments.

In various embodiments, normally-on transistors S1 and S2 receive switching control signals CTRL_S1 and CTRL_S2 from a controller (not shown, such as controller 110 as described in reference to FIG. 1). Primary stage 202 may be a totem pole PFC primary stage. Primary stage 202 may be coupled to a transformer and a secondary stage (not shown), as described above in reference to FIGS. 1 and 2. Diode D6 may decouple primary stage 202 from bias circuit 204 during an initial portion of the start-up procedure. In various embodiments, capacitor C1 is larger than capacitor C2 and both capacitors may have any value for capacitance. In some specific embodiments, capacitor C1 has a capacitance between 200 and 500 µF and is able to maintain a voltage of 450 V across its terminals while capacitor C2 has a capacitance between 10 and 40 µF and is also able to maintain a voltage of 450 V across its terminals. Inductor 208 is coupled between relays K1 and K2 and a central node between normally-on transistors S1 and S2.

Normally-on transistors S1 and S2 may be SiC JFETs or GaN HEMTs in two specific embodiments. In other embodiments, normally-on transistors S1 and S2 may be any type of normally-on transistor. Alternatively, transistors S1 and S2 may be implemented as normally-off transistors or other switching devices. Transistor Q1 is implemented as a normally-off MOSFET in some embodiments. In other embodiments, transistor Q1 may be any type of switching device.

In various embodiments, diodes D1, D2, D3, and D4 may operate as a rectifier at the input. Capacitor C3 may be an input capacitor and capacitors C4 and C5 may be output capacitors. Similarly, diodes D7 and D8 may serve as output diodes.

Figure 5:
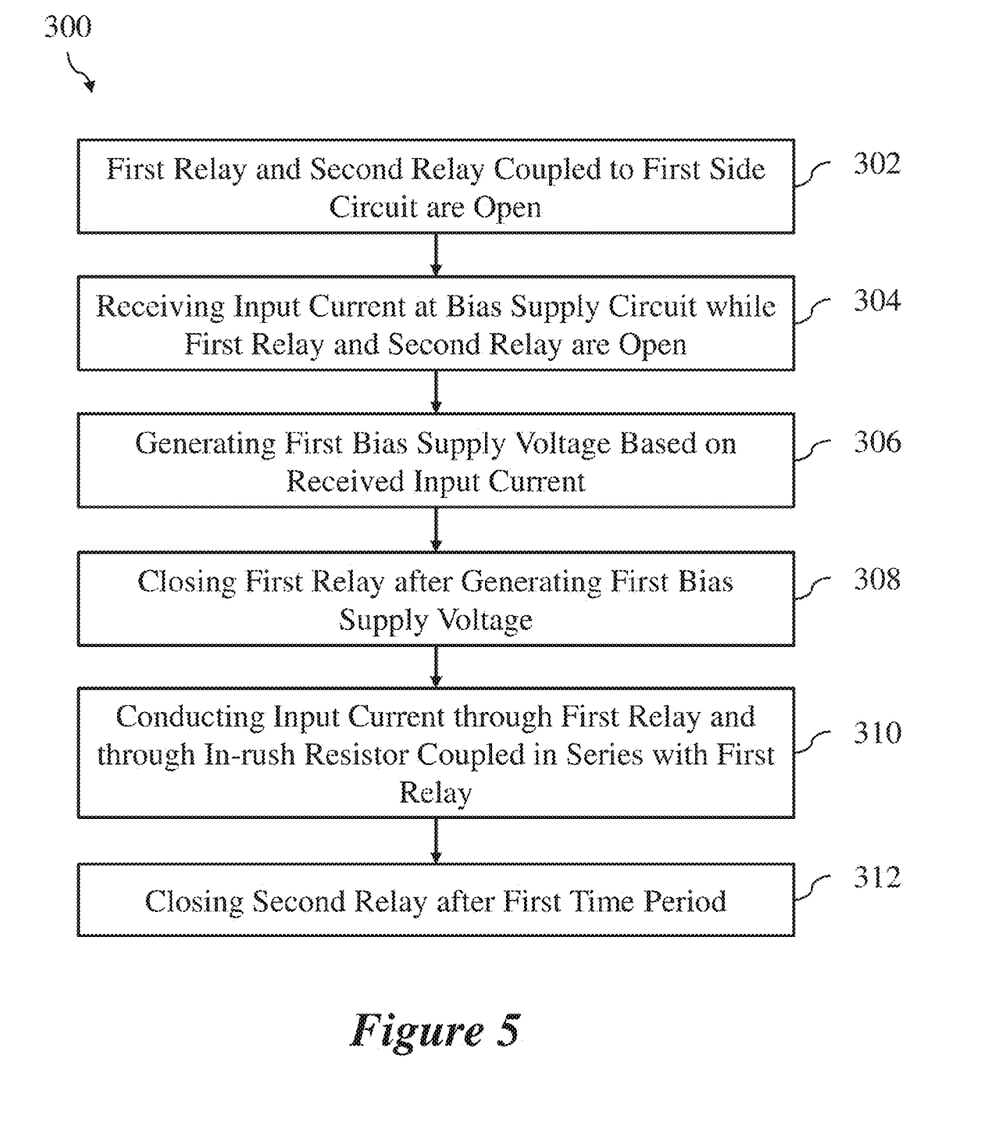
FIG. 5 illustrates a block diagram of a method of operation for an embodiment SMPS.

FIG. 5 illustrates a block diagram of a method of operation 300 for an embodiment SMPS including steps 302-312. According to various embodiments, steps 302-312 are included in a start-up sequence or procedure. Step 302 begins the start-up sequence, where a first relay and a second relay coupled to a first side circuit within the SMPS are open in step 302. In such embodiments, the first relay and the second relay may default to an open position and are always open before a current is supplied. In other embodiments, the first relay and the second relay may be controlled to be open during a start-up sequence or a restart sequence. Step 304 includes receiving an input current at a bias supply circuit while the first relay and the second relay are open. In step 306, a first bias supply voltage based on the received input current may be generated.

In various embodiments, step 308 follows step 306 and includes closing the first relay after generating the first bias supply voltage. Step 310 may include conducting the input current through the first relay and through an in-rush resistor coupled in series with the first relay. In step 312, the second relay may be closed after a first time period. Method of operation 300 may also include conducting the input current through the second relay during normal operation in some embodiments.

In various embodiments, following the start-up sequence, the SMPS may enter a normal operation mode. Steps 302-312 may be rearranged and additional steps may be included in various embodiments.

According to an embodiment, a method for operating a switched mode power supply (SMPS) includes, during a start-up sequence, receiving an input current at a bias supply circuit while a first relay and a second relay coupled to a first side circuit within the SMPS are open, generating a first bias supply voltage based on the received input current, closing the first relay after generating the first bias supply voltage, conducting the input current through the first relay and through an in-rush resistor coupled in series with the first relay, and closing the second relay after a first time period. Other embodiments include corresponding systems and apparatus, each configured to perform corresponding embodiment methods.

Implementations may include one or more of the following features. In various embodiments, the first side circuit includes an AC-DC converter including normally-on transistors. The first side circuit may include normally-on transistors. In some embodiments, each normally-on transistor is a GaN high electron mobility transistor (HEMT). In other embodiments, each normally-on transistor is a SiC junction field effect transistor (JFET).

In various embodiments, the method further includes supplying the SMPS with an alternating current as the input current, generating a second bias supply voltage at the bias supply circuit based on the alternating current, supplying the first bias supply voltage to the first side circuit, supplying the second bias supply voltage to a second side circuit, and providing switching control signals to normally-on transistors within the first side circuit. In such embodiments, the first side circuit and the second side circuit are separated by a transformer. Closing the first relay after generating the first bias supply voltage may include measuring the first bias supply voltage, measuring the second bias supply voltage, comparing the measured first bias supply voltage to a first voltage threshold, comparing the measured second bias supply voltage to a second voltage threshold, and closing the first relay when the measured first bias supply voltage exceeds the first voltage threshold and the measured second bias supply voltage exceeds the second voltage threshold.

In various embodiments, closing the first relay after generating the first bias supply voltage includes measuring the first bias supply voltage, comparing the measured first bias supply voltage to a first voltage threshold, and closing the first relay when the measured first bias supply voltage exceeds the first voltage threshold. In some embodiments, the first time period is programmed during operation. The first time period may be programmed based on circuit properties of the SMPS.

According to an embodiment, a switched mode power supply (SMPS) includes a first relay coupled to an input, a second relay coupled between the input and an in-rush resistor, a bias supply circuit coupled to the input, and a primary side switching circuit coupled to the first relay, the in-rush resistor, and the bias supply circuit. In such embodiments, the primary side switching circuit includes normally-on transistors and is configured to be coupled to an inductive element coupled to an output circuit. Other embodiments include corresponding systems and apparatus, each configured to perform corresponding embodiment methods.

Implementations may include one or more of the following features. In various embodiments, each normally-on transistor is a GaN high electron mobility transistor (HEMT). In other embodiments, each normally-on transistor is a SiC junction field effect transistor (JFET). In some embodiments, the SMPS further includes a power-on controller coupled to the first relay and the second relay. The power-on controller is configured to control the first relay and the second relay during a start-up sequence. In some embodiments, during the start-up sequence the power-on controller is configured to maintain the first relay and the second relay in a non-conducting state while the bias supply circuit receives an input alternating current, switch the first relay into a conducting state to conduct the input current through the first relay and through the in-rush resistor after the bias supply circuit generates an initial bias supply voltage, and switch the second relay into a conducting state to conduct the input current through the second relay after a first time period.

According to an embodiment, a switched mode power supply (SMPS) includes a controller configured to be coupled to a bias supply circuit, a first relay, and a second relay. During a start-up procedure, the controller is configured to maintain the first relay and the second relay open while the bias supply circuit receives an input alternating current, close the first relay to conduct the input current through the first relay and through an in-rush resistor after the bias supply circuit generates an initial bias supply voltage over a bias voltage threshold, and close the second relay to conduct the input current through the second relay after a first time period. Other embodiments include corresponding systems and apparatus, each configured to perform corresponding embodiment methods.

Implementations may include one or more of the following features. In various embodiments, the SMPS further includes a primary side circuit coupled to the in-rush resistor, the second relay, the bias supply circuit, and the controller. The primary side circuit may include a power factor correction (PFC) circuit including normally-on transistors and a DC-DC switching converter coupled to the PFC circuit. In some embodiments, each normally-on transistor is a GaN high electron mobility transistor (HEMT). In other embodiments, each normally-on transistor is a SiC junction field effect transistor (JFET). The controller may be further configured to program the first time period during operation. In some embodiments, the initial bias supply voltage includes a primary side bias voltage and a secondary side bias voltage, and the bias voltage threshold includes a primary side bias threshold and a secondary side bias threshold.

According to embodiments described herein, advantages may include highly efficient switching power supplies using normally-on transistors that are able to safely receive in-rush current and execute a start-up procedure.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a switched mode power supply (SMPS) comprising:
    during a start-up sequence:
        receiving an input current at a bias supply circuit while a first relay and a second relay coupled to a first side circuit within the SMPS are open;
        generating a first bias supply voltage based on the received input current;
        closing the first relay after generating the first bias supply voltage;
        conducting the input current through the first relay and through an in-rush resistor coupled in series with the first relay; and
        closing the second relay after a first time period.

2. The method of claim 1, wherein the first side circuit comprises an AC-DC converter comprising normally-on transistors.

3. The method of claim 1, wherein the first side circuit comprises normally-on transistors.

4. The method of claim 3, wherein each normally-on transistor is a GaN high electron mobility transistor (HEMT).

5. The method of claim 3, wherein each normally-on transistor is a SiC junction field effect transistor (JFET).

6. The method of claim 1, further comprising:
    supplying the SMPS with an alternating current as the input current;
    generating a second bias supply voltage at the bias supply circuit based on the alternating current;
    supplying the first bias supply voltage to the first side circuit;
    supplying the second bias supply voltage to a second side circuit, wherein the first side circuit and the second side circuit are separated by a transformer; and
    providing switching control signals to normally-on transistors within the first side circuit.

7. The method of claim 6, wherein closing the first relay after generating the first bias supply voltage comprises:
    measuring the first bias supply voltage,
    measuring the second bias supply voltage,
    comparing the measured first bias supply voltage to a first voltage threshold,
    comparing the measured second bias supply voltage to a second voltage threshold, and
    closing the first relay when the measured first bias supply voltage exceeds the first voltage threshold and the measured second bias supply voltage exceeds the second voltage threshold.

8. The method of claim 1, wherein closing the first relay after generating the first bias supply voltage comprises:
    measuring the first bias supply voltage,
    comparing the measured first bias supply voltage to a first voltage threshold, and
    closing the first relay when the measured first bias supply voltage exceeds the first voltage threshold.

9. The method of claim 1, wherein the first time period is programmed during operation.

10. The method of claim 9, wherein the first time period is programmed based on circuit properties of the SMPS.

11. A switched mode power supply (SMPS) comprising:
    a first relay coupled to an input;
    a second relay coupled between the input and an in-rush resistor;
    a bias supply circuit coupled to the input;
    a primary side switching circuit coupled to the first relay, the in-rush resistor, and the bias supply circuit, wherein the primary side switching circuit comprises normally-on transistors and is configured to be coupled to an inductive element coupled to an output circuit; and
    a power-on controller coupled to the first relay and the second relay, wherein the power-on controller is configured to control the first relay and the second relay during a start-up sequence, wherein during the start-up sequence, the power-on controller is configured to
        maintain the first relay and the second relay in a non-conducting state while the bias supply circuit receives an input alternating current,
        switch the first relay into a conducting state to conduct the input current through the first relay and through the in-rush resistor after the bias supply circuit generates an initial bias supply voltage, and
        switch the second relay into a conducting state to conduct the input current through the second relay after a first time period.

12. The SMPS of claim 11, wherein each normally-on transistor is a GaN high electron mobility transistor (HEMT).

13. The SMPS of claim 11, wherein each normally-on transistor is a SiC junction field effect transistor (JFET).

14. A switched mode power supply (SMPS) comprising:
    a controller configured to be coupled to a bias supply circuit, a first relay, and a second relay, wherein, during a start-up procedure, the controller is configured to:
        maintain the first relay and the second relay open while the bias supply circuit receives an input alternating current;
        close the first relay to conduct the input current through the first relay and through an in-rush resistor after the bias supply circuit generates an initial bias supply voltage over a bias voltage threshold; and close the second relay to conduct the input current through the second relay after a first time period.

15. The SMPS of claim 14, further comprising a primary side circuit coupled to the in-rush resistor, the second relay, the bias supply circuit, and the controller, wherein the primary side circuit comprises a power factor correction (PFC) circuit comprising normally-on transistors and a DC-DC switching converter coupled to the PFC circuit.

16. The SMPS of claim 15, wherein each normally-on transistor is a GaN high electron mobility transistor (HEMT).

17. The SMPS of claim 15, wherein each normally-on transistor is a SiC junction field effect transistor (JFET).

18. The SMPS of claim 14, wherein the controller is further configured to program the first time period during operation.

19. The SMPS of claim 14, wherein
the initial bias supply voltage comprises a primary side bias voltage and a secondary side bias voltage, and
the bias voltage threshold comprises a primary side bias threshold and a secondary side bias threshold.

* * * * *